United States Patent
Sato et al.

(10) Patent No.: US 12,422,109 B2
(45) Date of Patent: Sep. 23, 2025

(54) LIGHTING SYSTEM

(71) Applicant: Panasonic Intellectual Property Management Co., Ltd., Osaka (JP)

(72) Inventors: Toshihiko Sato, Osaka (JP); Norishige Nanai, Osaka (JP); Yosuke Mizokami, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 18/289,566

(22) PCT Filed: Mar. 10, 2022

(86) PCT No.: PCT/JP2022/010526
§ 371 (c)(1),
(2) Date: May 21, 2024

(87) PCT Pub. No.: WO2022/239436
PCT Pub. Date: Nov. 17, 2022

(65) Prior Publication Data
US 2024/0302004 A1   Sep. 12, 2024

(30) Foreign Application Priority Data
May 14, 2021 (JP) .................. 2021-082735

(51) Int. Cl.
*F21Y 115/10* (2016.01)
*F21K 9/61* (2016.01)
(Continued)

(52) U.S. Cl.
CPC .................. *F21K 9/61* (2016.08); *F21K 9/64* (2016.08); *F21K 9/69* (2016.08); *F21Y 2115/10* (2016.08)

(58) Field of Classification Search
CPC .... G02B 6/0006; G02B 6/0008; G02B 6/262; G02B 6/0003; G02B 23/2469; F21Y 115/10
See application file for complete search history.

(56) References Cited

U.S. PATENT DOCUMENTS

| | | | |
|---|---|---|---|
| 2009/0040598 A1* | 2/2009 | Ito | A61B 1/0638 359/332 |
| 2009/0109698 A1* | 4/2009 | Koyata | G02B 19/0014 362/553 |

(Continued)

FOREIGN PATENT DOCUMENTS

| JP | 2007-027388 A | 2/2007 |
|---|---|---|
| JP | 2007-042981 A | 2/2007 |

(Continued)

OTHER PUBLICATIONS

International Search Report (with translation) and Written Opinion for corresponding Application No. PCT/ JP2022/010526, mailed May 31, 2022.

(Continued)

*Primary Examiner* — William J Carter
(74) *Attorney, Agent, or Firm* — Renner, Otto, Boisselle & Sklar, LLP

(57) ABSTRACT

In a lighting system, a wavelength-converting fiber includes a light inlet portion, a light outlet portion, and a wavelength-converting portion containing a wavelength-converting element. The wavelength-converting element may be excited not only by excitation light to produce a spontaneous emission of light having a longer wavelength than the excitation light but also by an amplified spontaneous emission of light. A first light source unit emits the excitation light. A second light source unit emits a seed light ray causing the wavelength-converting element that has been excited by either the excitation light P1 or the amplified (Continued)

spontaneous emission of light to produce a stimulated emission of light. An optical system makes the excitation light coming from the first light source unit and the seed light ray coming from the second light source unit incident on the light inlet portion. The output lens condenses outgoing light coming from the light outlet portion.

11 Claims, 6 Drawing Sheets

(51) Int. Cl.
*F21K 9/64* (2016.01)
*F21K 9/69* (2016.01)

(56) References Cited

U.S. PATENT DOCUMENTS

2013/0148925 A1* 6/2013 Muendel .............. G02B 6/4216
385/27

| | | | |
|---|---|---|---|
| 2018/0329130 | A1 | 11/2018 | Tanaka |
| 2020/0194962 | A1 | 6/2020 | Jhang et al. |
| 2022/0283354 | A1 | 9/2022 | Aketa et al. |

FOREIGN PATENT DOCUMENTS

| | | | |
|---|---|---|---|
| JP | 2008-122838 A | 5/2008 | |
| JP | 2009-266463 A | 11/2009 | |
| JP | 2012-243789 A | 12/2012 | |
| JP | 2018-195627 A | 12/2018 | |
| WO | WO-2021014853 A1 * | 1/2021 | ............... F21V 9/30 |

OTHER PUBLICATIONS

International Search Report (with translation) and Written Opinion for related Application No. PCT/JP2022/010524, mailed May 10, 2022.

Co-Pending U.S. Application No. (National Stage of PCT/JP2022/010524; to Norishige Nanai et al., entitled "Light-Emitting System", filed Nov. 5, 2023.

\* cited by examiner

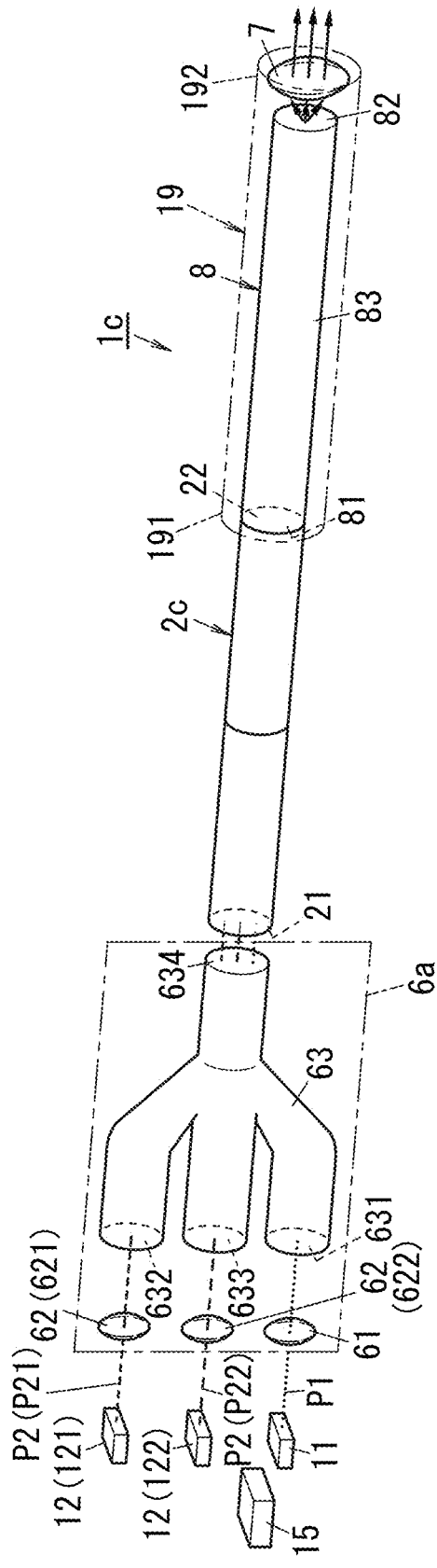
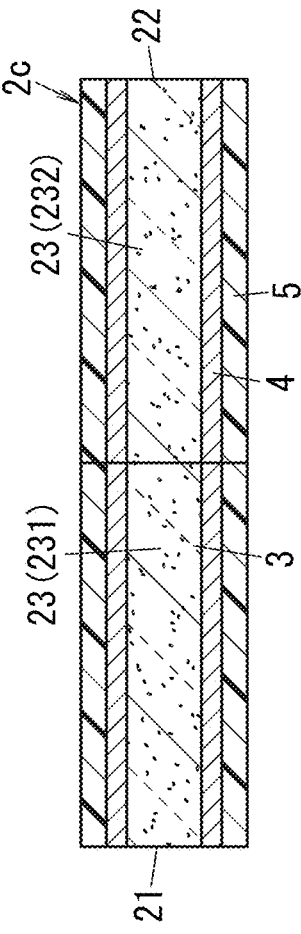
FIG. 6A
FIG. 6B

LIGHTING SYSTEM

TECHNICAL FIELD

The present disclosure generally relates to a lighting system, and more particularly relates to a lighting system that uses excitation light.

BACKGROUND ART

A lighting fixture including a case, a projection lens, and a light source device has been proposed in the art (see, for example, Patent Literature 1). The light source device disclosed in Patent Literature 1 includes a solid-state light source and a light transmission fiber. The light transmission fiber has a first end face and a second end face, and excitation light emitted from the solid-state light source is introduced into the fiber through the first end face thereof. The light transmission fiber includes a wavelength-converting core, a light-guiding core, and a clad. The wavelength-converting core contains a wavelength-converting material that produces a population inversion state of electrons by absorbing the excitation light and that lets wavelength-converted light, falling within the visible radiation range, emerge therefrom. The light-guiding core covers the peripheral surface of the wavelength-converting core and transmits the wavelength-converted light in a direction from the first end face toward the second end face. The clad covers the peripheral surface of the light-guiding core.

The light transmission fiber is configured to have a stimulated emission produced by the wavelength-converted light propagating through the light-guiding core and to let not only the excitation light, coming from the solid-state light source, but also the wavelength-converted light, amplified by the stimulated emission, emerge from the second end face.

It is difficult for the lighting fixture of Patent Literature 1 to increase the intensity of the wavelength-converted light.

CITATION LIST

Patent Literature

Patent Literature 1: JP 2018-195627 A

SUMMARY OF INVENTION

An object of the present disclosure is to provide a lighting system with the ability to increase the intensity of light having a different wavelength from excitation light.

A lighting system according to an aspect of the present disclosure includes a wavelength-converting fiber, a first light source unit, a second light source unit, an optical system, and an output lens. The wavelength-converting fiber includes: a light inlet portion; a light outlet portion; and a wavelength-converting portion containing a wavelength-converting element. The wavelength-converting portion is interposed between the light inlet portion and the light outlet portion. The wavelength-converting element may be excited not only by excitation light to produce a spontaneous emission of light having a longer wavelength than the excitation light but also by an amplified spontaneous emission of light. The first light source unit emits the excitation light. The second light source unit emits a seed light ray causing the wavelength-converting element that has been excited by either the excitation light or the amplified spontaneous emission of light to produce a stimulated emission of light. The optical system makes the excitation light coming from the first light source unit and the seed light ray coming from the second light source unit incident on the light inlet portion. The output lens condenses outgoing light coming from the light outlet portion.

BRIEF DESCRIPTION OF DRAWINGS

FIG. 6A illustrates a configuration for a lighting system according to a fourth embodiment; and FIG. 6B is a cross-sectional view of a part of the lighting system.

DESCRIPTION OF EMBODIMENTS

The drawings to be referred to in the following description of first to fourth embodiments and their variations are all schematic representations. That is to say, the ratio of the dimensions (including thicknesses) of respective constituent elements illustrated on the drawings does not always reflect their actual dimensional ratio.

First Embodiment

A lighting system 1 according to a first embodiment will be described with reference to FIGS. 1A-3C.

(1) Overview

Figure 1A:
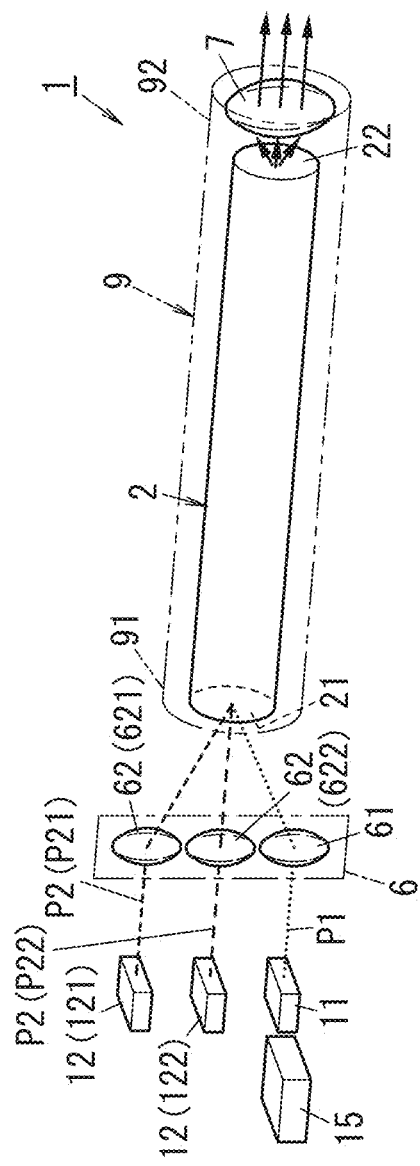
FIG. 1A illustrates a configuration for a lighting system according to a first embodiment.
Figure 1B:
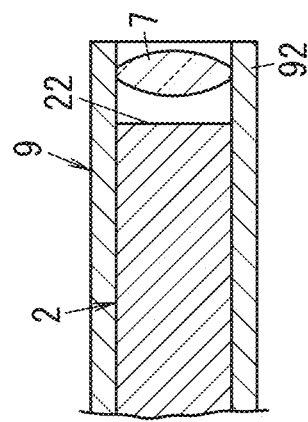
FIG. 1B is a cross-sectional view of a part of the lighting system.
Figure 2:
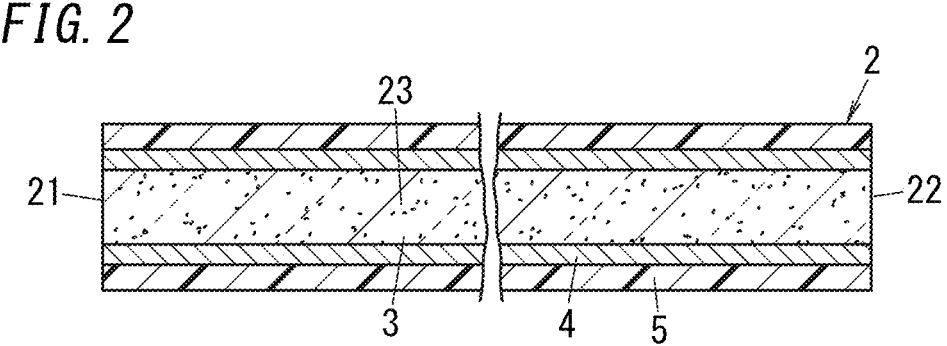
FIG. 2 is a cross-sectional view of a wavelength-converting fiber of the lighting system.
Figure 3A:
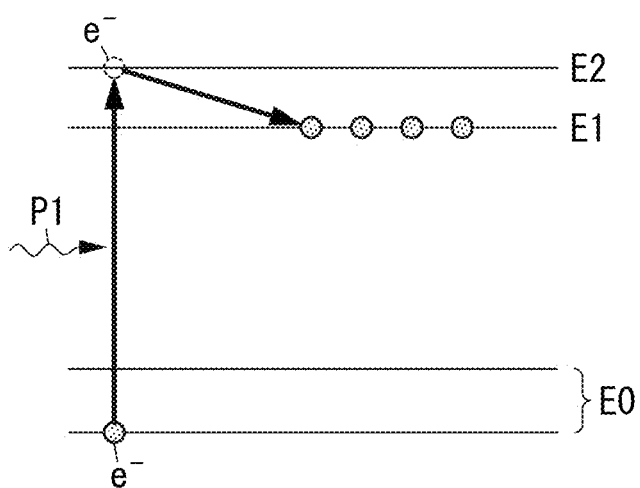
FIGS. 3A-3C illustrate an operating principle of the lighting system.
Figure 3B:
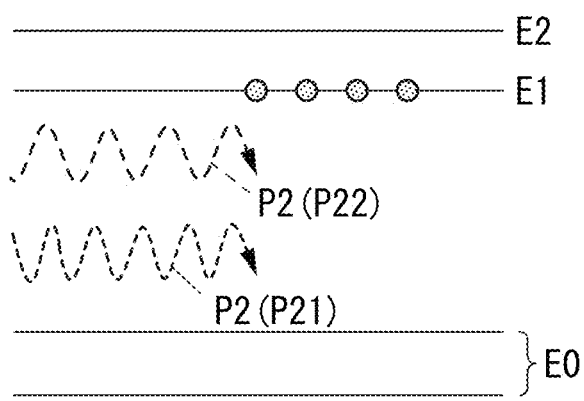
Figure 3C:
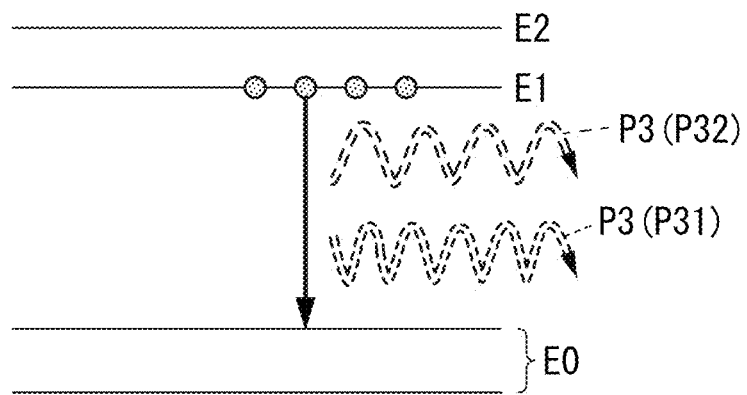

The lighting system 1 makes excitation light P1 and a seed light ray P2 incident on a wavelength-converting fiber 2 including a wavelength-converting portion 23 containing a wavelength-converting element (chemical element) as shown in FIGS. 1A, 1B, and 2. The excitation light P1 excites the wavelength-converting element. The seed light ray P2 causes the wavelength-converting element that has been excited by the excitation light P1 to produce a stimulated emission of light P3 (refer to FIG. 3C). From the wavelength-converting fiber 2, light including the excitation light P1 and the stimulated emission of light P3 is output. FIGS. 3A-3C illustrate the principle of operation of the lighting system 1. In FIGS. 3A, 3B, and 3C, the ordinate represents the energy of electrons. The upward arrow shown in FIG. 3A indicates absorption of the excitation light P1. The downward arrow shown in FIG. 3C indicates transition about a spontaneous emission of light or a stimulated emission of light P3. In the lighting system 1, an electron $e^-$ in a ground state E0 (including a plurality of energy levels) of the wavelength-converting element is excited to an excitation level E2 by the excitation light P1 that has been incident on the wavelength-converting fiber 2. Then, the electron $e^-$ at the excitation level E2 makes a transition to a metastable level E1, which is an energy level lower than the excitation level E2. Thereafter, the stimulated emission of light P3 (P32) is produced when the electron e⁻ at the metastable level E1 is caused to make a transition to one of the highest ones of the plurality of energy levels (hereinafter referred to as a "second energy level") of the ground state E0 by the seed light ray P2 (P22). The wavelength of the seed light ray P2 (P22) corresponds to the difference in energy between the metastable level E1 and the second energy level, for example. In addition, a stimulated emission of light P3 (P31) is also produced when the electron e⁻ at the metastable level E1 is caused to make a transition to another energy level (hereinafter referred to as a "first energy level"), lower than the second energy level out of the plurality of energy levels of the ground state E0, by the seed light ray P2 (P21). The wavelength of the seed light ray P2 (P21) corresponds to the difference in energy between the metastable level E1 and the first energy level.

(2) Configuration for Lighting System

As shown in FIG. 1A, the lighting system 1 includes the wavelength-converting fiber 2, a first light source unit 11, two second light source units 12, an optical system 6, and an output lens 7. The first light source unit 11 emits the excitation light P1. The two second light source units 12 emit seed light rays P2 (hereinafter referred to as "external seed light rays P2") causing the wavelength-converting element that has been excited by the excitation light P1 to produce a stimulated emission of light P3 (refer to FIG. 3C). The lighting system 1 further includes a protective tube 9 having flexibility. The protective tube 9 surrounds the side surface of the wavelength-converting fiber 2.

The lighting system 1 may be used, for example, in medical endoscopes to light up the inside of a human body for the purposes of, for example, observing the inside of human body cavities or hollow organs, taking a specimen therefrom, or giving medical treatment therefor. That is to say, the lighting system 1 may be, for example, a lighting system for use in endoscopes. In that case, in the lighting system 1, a housing that houses the first light source unit 11, the second light source units 12, and the optical system 6 is located outside the human body. When the lighting system 1 is applied to an endoscope, an inserting portion, designed to be inserted into a human body, of the endoscope includes, for example, the wavelength-converting fiber 2, the output lens 7, and the protective tube 9, and further includes an image sensor (such as a CCD camera), a nozzle, and a treatment tool (such as a forceps).

(2.1) Wavelength Converting Fiber

The wavelength-converting fiber 2 is an optical fiber containing a wavelength-converting element in its core. The wavelength-converting fiber 2 includes a core 3, cladding 4, and a jacket 5 as shown in FIG. 2. The cladding 4 covers the outer peripheral surface (side surface) of the core 3. The jacket 5 covers the outer peripheral surface (side surface) of the cladding 4. A cross section, taken along a plane perpendicular to the optical axis, of the core 3 has a circular shape. The cladding 4 is disposed coaxially with the core 3.

The core 3 has a first end face and a second end face, which is located at the opposite longitudinal end of the core 3 from the first end face. The core 3 includes a light-transmitting material and the wavelength-converting element. The concentration of the wavelength-converting element in the core 3 may or may not be substantially uniform along the entire length of the core 3. The refractive index of the core 3 may be substantially equal to the refractive index of the light-transmitting material that is a main component of the core 3.

The light-transmitting material may be, for example, a fluoride, an oxide, or a nitride. The fluoride may be glass fluoride, for example. The oxide may be a silicon oxide or quartz, for example.

The wavelength-converting element is a rare-earth element. In this embodiment, the wavelength-converting element includes an element selected from the group consisting of, for example, Pr, Tb, Ho, Dy, Er, Eu, Nd, and Mn. The wavelength-converting element is contained as an ion of a rare-earth element in the core 3, e.g., contained as an ion of Pr (i.e., $Pr^{3+}$) or an ion of Tb (i.e., $Tb^{3+}$) in the core 3. In this case, the wavelength-converting element may be excited by either the excitation light P1 or an amplified spontaneous emission (ASE) of light. The ASE of light is produced by amplifying the spontaneous emission of light, emitted from a different wavelength-converting element other than the wavelength-converting elements itself, as internal seed light ray. Through such excitation, the wavelength-converting element emits not only an ASE unique to the element of the wavelength-converting element but also a stimulated emission of light having the same wavelength as the external seed light ray P2, thus emitting them as the stimulated emission of light P3. The wavelengths of the ASE and the external seed light ray P2 are longer than the wavelength of the excitation light P1 (which may fall within the range from 440 nm to 450 nm, for example). The wavelength of the seed light ray P2 will be described later in the "(2.3) Second light source unit" section.

$Pr^{3+}$ is a wavelength-converting element that may emit either an ASE or an amplified seed light ray in the cyan to red range. The intensity of the stimulated emission of light depends on the respective intensities of the internal seed light ray (the spontaneous emission of light) and the external seed light ray. If the core 3 contains $Pr^{3+}$ and $Tb^{3+}$, then $Tb^{3+}$ is excited by absorbing an ASE from $Pr^{3+}$ and may produce an ASE having a wavelength unique to $Tb^{3+}$.

The refractive index of the cladding 4 is smaller than the refractive index of the core 3. The cladding 4 does not contain the wavelength-converting element contained in the core 3.

The material of the jacket 5 may be a resin, for example. The jacket 5 preferably has an outside diameter equal to or less than 1 mm.

The wavelength-converting fiber 2 includes a light inlet portion 21, a light outlet portion 22, and a wavelength-converting portion 23.

The light inlet portion 21 is a portion on which the excitation light P1 is incident and may include the first end face of the core 3, for example. The light outlet portion 22 includes the second end face of the core 3, through which light including the excitation light P1 and the stimulated emission of light P3 such as an ASE emerges.

The light inlet portion 21 may include a reflection reducing portion for reducing the reflection of the excitation light P1 incident on the light inlet portion 21 from outside of the wavelength-converting fiber 2. The reflection reducing portion may be, for example, an anti-reflection coating that covers the first end face of the core 3.

The wavelength-converting portion 23 is interposed between the light inlet portion 21 and the light outlet portion 22. The wavelength-converting portion 23 contains a wavelength-converting element which is excited by the excitation light P1 to produce light having a longer wavelength than the excitation light P1. The wavelength-converting element is an element that may absorb the excitation light P1 and amplify, by stimulated emission, either the spontaneous emission of light or seed light ray P2 each having a longer wavelength than the excitation light P1. That is to say, the wavelength-converting element may be not only excited by the excitation light P1 to produce a spontaneous emission of light having a longer wavelength than the excitation light P1 but also excited by an amplified spontaneous emission of light.

The core 3 may have a diameter equal to or greater than 25 μm and equal to or less than 500 μm, for example. As for the length of the wavelength-converting portion 23, the lower the concentration of the wavelength-converting element in the wavelength-converting portion 23 is, the greater the length of the wavelength-converting portion 23 preferably is. The wavelength-converting fiber 2 may have a numerical aperture of 0.22, for example. The concentration of the wavelength-converting element in the wavelength-converting portion 23 is the concentration of the wavelength-converting element in the core 3.

(2.2) First Light Source Unit

The first light source unit 11 emits the excitation light P1 to excite the wavelength-converting element contained in the wavelength-converting portion 23 of the wavelength-converting fiber 2. The excitation light P1 coming from the first light source unit 11 is incident on the light inlet portion 21 of the wavelength-converting fiber 2 via the optical system 6. From the viewpoint of exciting the wavelength-converting element more efficiently, the excitation light P1 preferably has a wavelength equal to or longer than 350 nm and equal to or shorter than 500 nm.

The first light source unit 11 may include a laser light source, for example. The laser light source emits a laser beam. The excitation light P1 coming from the first light source unit 11 (i.e., the laser beam emitted from the laser light source) is incident on the light inlet portion 21 via the optical system 6. The laser light source may be, for example, a semiconductor laser diode that emits a blue laser beam. In that case, the excitation light P1 may have a wavelength equal to or longer than 440 nm and equal to or shorter than 450 nm, for example.

(2.3) Second Light Source Unit

The second light source unit 12 emits the seed light ray P2. The seed light ray P2 coming from the second light source unit 12 is incident on the light inlet portion 21 of the wavelength-converting fiber 2 via the optical system 6.

The lighting system 1 includes a plurality of (e.g., two) second light source units 12, each of which emits, for example, a seed light ray P2 having a single wavelength. The seed light ray P2 emitted from one of these two second light source units 12 has a different wavelength from the seed light ray P2 emitted from the other of these two second light source units 12. In the following description, one of the two second light source units 12 will be hereinafter referred to as a "second light source unit 121" and the other second light source unit 12 will be hereinafter referred to as a "second light source unit 122" for convenience sake. The second light source unit 121 may be a semiconductor laser diode that emits a green light ray, for example. The second light source unit 122 may be a semiconductor laser diode that emits a red light ray, for example. If the wavelength-converting element of the wavelength-converting portion 23 includes $Pr^{3+}$, then the wavelength of the green seed light ray P21 is preferably about 520 nm, for example, and the wavelength of the red seed light ray P22 is preferably about 640 nm, for example. These second light source units 12 are light sources, each of which emits a quasi-monochromatic light ray. As used herein, the "quasi-monochromatic light ray" refers to a light ray falling within a narrow wavelength range (with a width of 10 nm, for example). The number of the second light source units 12 included in the lighting system 1 does not have to be two but may also be three or more or even one. If the lighting system 1 includes three second light source units 12, then the lighting system 1 may include, as the three second light source units 12, a semiconductor laser diode that emits a green light ray, a semiconductor laser diode that emits a red light ray, and a semiconductor laser diode that emits an orange light ray. The orange seed light ray preferably has a wavelength of about 600 nm, for example.

The light ray coming from the second light source unit 121 is incident as a seed light ray P2 (P21) on the light inlet portion 21 of the wavelength-converting fiber 2 via the optical system 6. The light ray coming from the second light source unit 122 is incident as a seed light ray P2 (P22) on the light inlet portion 21 of the wavelength-converting fiber 2 via the optical system 6.

(2.4) Optical System

The optical system 6 makes the excitation light P1 coming from the first light source unit 11, the seed light ray P2 (P21) coming from the second light source unit 121, and the seed light ray P2 (P22) coming from the second light source unit 122 incident on the light inlet portion 21. The optical system 6 serves as an optical coupler for making the excitation light P1 and the respective seed light rays P2 incident on the light inlet portion 21 of the wavelength-converting fiber 2.

The optical system 6 includes a first condenser lens 61 and two second condenser lenses 62. The first condenser lens 61 condenses the excitation light P1 coming from the first light source unit 11. The two second condenser lenses 62 are provided one to one for the two second light source units 12. Each of these two second condenser lenses 62 condenses the seed light ray P2 coming from a corresponding second light source unit 12. In the following description, the second condenser lens 62 provided for the second light source unit 121 will be hereinafter referred to as a "second condenser lens 621" and the second condenser lens 62 provided for the second light source unit 122 will be hereinafter referred to as a "second condenser lens 622" for the sake of convenience.

The first condenser lens 61 is interposed between the first light source unit 11 and the light inlet portion 21 of the wavelength-converting fiber 2 to condense the excitation light P1 coming from the first light source unit 11 toward the light inlet portion 21. The first condenser lens 61 may be, but does not have to be, a biconvex lens, for example. Alternatively, the first condenser lens 61 may also be a Fresnel lens, for example.

The second condenser lens 621 is interposed between the second light source unit 121 and the light inlet portion 21 of the wavelength-converting fiber 2 to condense the seed light ray P21 coming from the second light source unit 121 toward the light inlet portion 21. The second condenser lens 621 may be, but does not have to be, a biconvex lens, for example. Alternatively, the second condenser lens 621 may also be a Fresnel lens, for example.

The second condenser lens 622 is interposed between the second light source unit 122 and the light inlet portion 21 of the wavelength-converting fiber 2 to condense the seed light ray P22 coming from the second light source unit 122 toward the light inlet portion 21. The second condenser lens 622 may be, but does not have to be, a biconvex lens, for example. Alternatively, the second condenser lens 622 may also be a Fresnel lens, for example.

Optionally, the optical system 6 may include a first collimator lens interposed between the first light source unit 11 and the first condenser lens 61 to collimate the excitation light P1 coming from the first light source unit 11. In addition, the optical system 6 may also include a second collimator lens interposed between the second light source unit 121 and the second condenser lens 621 to collimate the seed light ray P21 coming from the second light source unit 121. Besides, the optical system 6 may further include a second collimator lens interposed between the second light source unit 122 and the second condenser lens 622 to collimate the seed light ray P22 coming from the second light source unit 122.

(2.5) Output Lens

The output lens 7 condenses the light coming from the light outlet portion 22. That is to say, the output lens 7 lets the light coming from the wavelength-converting fiber 2 emerge therefrom. The output lens 7 serves as an objective lens. The output lens 7 may be, for example, a biconvex lens. The output lens 7 is held by the protective tube 9. The output lens 7 is disposed inside the protective tube 9 to face the light outlet portion 22 of the wavelength-converting fiber 2.

(2.6) Protective Tube

The protective tube 9 protects the wavelength-converting fiber 2. A material for the protective tube 9 may be a metal, for example. The protective tube 9 has flexibility. The protective tube 9 has a first end 91 and a second end 92. In the protective tube 9, the first end 91 of the protective tube 9 surrounds the light inlet portion 21 of the wavelength-converting fiber 2 and the second end 92 of the protective tube 9 surrounds the light outlet portion 22 of the wavelength-converting fiber 2 and the output lens 7.

(2.7) Other Constituent Elements

The lighting system 1 includes a housing to house the first light source unit 11 and the two second light source units 12 therein.

The lighting system 1 further includes an adjustment unit 15. The adjustment unit 15 adjusts the intensity of the seed light ray P2 having at least one wavelength. In the lighting system 1 according to the first embodiment, the adjustment unit 15 adjusts the intensity of the excitation light P1 and the respective intensities of the seed light rays P21, P22. The adjustment unit 15 includes: a first driver circuit for driving the first light source unit 11; a plurality of second driver circuits, which are provided one to one for the plurality of second light source units 12 and each of which drives a corresponding one of the second light source units 12; and a control circuit for controlling the first driver circuit and the plurality of second driver circuits on an individual basis. In the adjustment unit 15, the control circuit controls the first driver circuit and the plurality of second driver circuits on an individual basis, thus making the chromaticity of the light emerging from the (light outlet portion 22 of the) wavelength-converting fiber 2 adjustable. In short, the lighting system 1 includes the adjustment unit 15, thus enabling controlling the color of the outgoing light. This allows the lighting system 1 to adjust the color of the light emerging from the output lens 7. In this embodiment, the adjustment unit 15 is housed in the housing. However, this is only an example and the adjustment unit 15 does not have to be housed in the housing. The first driver circuit and the plurality of second driver circuits are supplied with supply voltage from a first power supply circuit, for example. Meanwhile, the control circuit is supplied with supply voltage from a second power supply circuit, for example. In this embodiment, the first power supply circuit and the second power supply circuit are not counted among the constituent elements of the lighting system 1. However, this is only an example and should not be construed as limiting. Alternatively, the first power supply circuit and the second power supply circuit may be counted among constituent elements of the lighting system 1.

(3) Operation of Lighting System

The lighting system 1 makes the first light source unit 11 emit the excitation light P1 and also makes the second light source units 12 emit the seed light rays P2. Thus, the lighting system 1 allows the excitation light P1 and the seed light rays P2 to be incident on the light inlet portion 21 of the wavelength-converting fiber 2. Part of the excitation light P1 incident on the light inlet portion 21 emerges from the light outlet portion 22. In the lighting system 1, the light emerging from the light outlet portion 22 of the wavelength-converting fiber 2 is mixed light in which the excitation light P1, an ASE with a wavelength of about 480 nm and produced from the wavelength-converting element, and the stimulated emission of light P3 having the same wavelength as the seed light rays P2 are mixed together. Two types of stimulated emissions of light P31, P32 corresponding one to one to the two types of seed light rays P21, P22 and having mutually different wavelengths may be, for example, a green ray and a red ray, respectively. In that case, the light (i.e., mixed light) emerging from the light outlet portion 22 of the wavelength-converting fiber 2 may be white light, for example. In FIG. 3C, the lower stimulated emission of light P3 (P31) is the green ray and the upper stimulated emission of light P3 (P32) is the red ray.

In the wavelength-converting fiber 2, a stimulated emission is produced by the spontaneous emission of light and the seed light rays P2, and therefore, the excitation light P1 incident on the light inlet portion 21 and the stimulated emission of light P3 amplified by stimulated emission emerge from the light outlet portion 22. The stimulated emission of light P3, having the same wavelength as the seed light ray P21, out of the light emerging from the light outlet portion 22 of the wavelength-converting fiber 2 has a higher intensity than the seed light ray P21 incident from the second light source unit 121 onto the light inlet portion 21. Also, the stimulated emission of light P3, having the same wavelength as the seed light ray P22, out of the light emerging from the light outlet portion 22 of the wavelength-converting fiber 2 has a higher intensity than the seed light ray P22 incident from the second light source unit 122 onto the light inlet portion 21. The mixed light emerging from the light outlet portion 22 of the wavelength-converting fiber 2 is incoherent light. In the lighting system 1, the chromaticity, color temperature, color rendering index, and other parameters of the light emerging from the output lens 7 are determined by the respective wavelengths of the ASE and the seed light rays P2. Note that the operation of the lighting system 1 is different from the operation of a fiber laser that produces laser oscillation.

In the lighting system 1, the wavelength-converting element that serves as a heat source is distributed in the core 3 of the wavelength-converting fiber 2, and therefore, an increase in temperature may be reduced while the lighting system 1 is being used.

Also, in the lighting system 1, the adjustment unit 15 adjusts the intensity of the excitation light P1 and the respective intensities of the multiple seed light rays P2. However, this is only an example and should not be construed as limiting. Alternatively, the adjustment unit 15 may also be configured to adjust the intensity of the seed light ray P2 having at least one wavelength.

(4) Recapitulation

A lighting system 1 according to the first embodiment includes a wavelength-converting fiber 2, a first light source unit 11, two second light source units 121, 122, an optical system 6, and an output lens 7. The wavelength-converting fiber 2 includes: a light inlet portion 21; a light outlet portion 22; and a wavelength-converting portion 23 containing a wavelength-converting element. The wavelength-converting portion 23 is interposed between the light inlet portion 21 and the light outlet portion 22. The wavelength-converting element may be excited not only by excitation light P1 to produce a spontaneous emission of light having a longer wavelength than the excitation light P1 but also by an amplified spontaneous emission of light. The first light source unit 11 emits the excitation light P1. The second light source units 121, 122 emit seed light rays P21, P22 causing the wavelength-converting element that has been excited by either the excitation light P1 or the amplified spontaneous emission of light to produce stimulated emissions of light P31, P32. The optical system 6 makes the excitation light P1 coming from the first light source unit 11 and the seed light rays P21, P22 coming from the two second light source units 121, 122, respectively, incident on the light inlet portion 21. The output lens 7 condenses outgoing light coming from the light outlet portion 22 of the wavelength-converting fiber 2.

The lighting system 1 according to the first embodiment enables increasing the intensity of light (stimulated emission of light P3) having a different wavelength from the excitation light P1.

In addition, in the lighting system 1 according to the first embodiment, the optical system 6 includes a first condenser lens 61, a second condenser lens 621, and a second condenser lens 621. This allows the excitation light P1 and the seed light ray P21, P22, having mutually different wavelengths, to be more efficiently incident, thus contributing to increasing the light output.

Furthermore, the lighting system 1 according to the first embodiment further includes an adjustment unit 15 for adjusting the respective intensities of multiple seed light rays P2 having multiple different wavelengths, thus making the chromaticity of the light emerging from the output lens 7 adjustable.

Moreover, in the lighting system 1 according to the first embodiment, the wavelength-converting portion 23 contains $Pr^{3+}$ as the wavelength-converting element. This not only allows an ASE in cyan to be emitted but also increases the respective intensities of stimulated emissions in green and red, because a plurality of seed light rays P2 with mutually different wavelengths are incident onto the light inlet portion 21. This allows the lighting system 1 according to the first embodiment to improve the color rendering performance of the light emerging from the output lens 7. Furthermore, in the lighting system 1 according to the first embodiment, the wavelength-converting portion 23 contains $Pr^{3+}$ and $Tb^{3+}$ as two types of wavelength-converting elements, thus further improving the color rendering performance of the light emerging from the output lens 7.

In the lighting system 1, the combination of the wavelength of the excitation light P1 and the wavelength-converting element may be determined to let visible light and near-infrared light emerge from the output lens 7. In this case, the near-infrared light may have a wavelength equal to or longer than 700 nm and equal to or shorter than 750 nm, for example. This makes the lighting system 1 according to the first embodiment suitably usable as, for example, a lighting system in an endoscope, in which indocyanine green (ICG) fluorescent light observation is performed. Alternatively, in the lighting system 1, the combination of the wavelength of the excitation light P1 and the wavelength-converting element may be determined to let visible light, ultraviolet light, and near-infrared light emerge. In this case, the ultraviolet light may have a wavelength equal to or longer than 350 nm and equal to or shorter than 380 nm, for example. This allows the lighting system 1 according to the first embodiment to use the ultraviolet light emerging from the output lens 7 of the lighting system 1 as ultraviolet light for giving medical treatment using an endoscope, for example.

In recent years, endoscopes have been developed so rapidly as to make the resolution of the video shot by the endoscopes comparable to, or even higher than, that of high-definition video. Meanwhile, in the technical field of endoscopes, it is also known that changing the wavelength of light for use in observation would cause the information acquired to vary significantly due to a difference in absorption and scattering properties among individual organisms. Nevertheless, to realize a lighting system having the ability to output light rays with multiple different wavelengths, either multiple light source units, each including a light source and a phosphor as a set, or multiple filters need to be provided on an individual basis for the multiple wavelengths. This means a significant increase in the cost, overall size, and weight of the lighting system, which should be avoided in one way or another. In addition, in laser lighting equipment including a light source, an optical fiber, and a phosphor device, the light converted by the phosphor device comes to have Lambertian distribution. That is why to have its light output enhanced, such laser lighting equipment should include an optical fiber with an increased diameter, which would cause an increase in overall size as well.

In contrast, the lighting system 1 according to the first embodiment includes the adjustment unit 15 that makes the respective outputs of the plurality of seed light rays P2 adjustable, thus enabling adjusting the color of light falling within the ultraviolet to near-infrared range of the spectrum, for example. This allows the lighting system 1 according to the first embodiment to cut down the number of light sources to provide and the number of optical members such as filters required, thereby contributing to cutting down the cost, overall size, and weight.

Furthermore, in the lighting system 1 according to the first embodiment, the wavelength-converting fiber 2 may be designed to have a core diameter falling within the range from 1 μm to 500 μm, for example. Thus, the light emerging from the wavelength-converting fiber 2 of this lighting system 1 has a smaller light distribution angle than the light emerging from the phosphor device of the laser lighting equipment. This allows the lighting system 1 to efficiently guide the light coming from the wavelength-converting fiber 2 to an optical fiber, for example. Consequently, an endoscope, to which this lighting system 1 is applied, may enhance its light output while decreasing its diameter.

Second Embodiment

Figure 4:
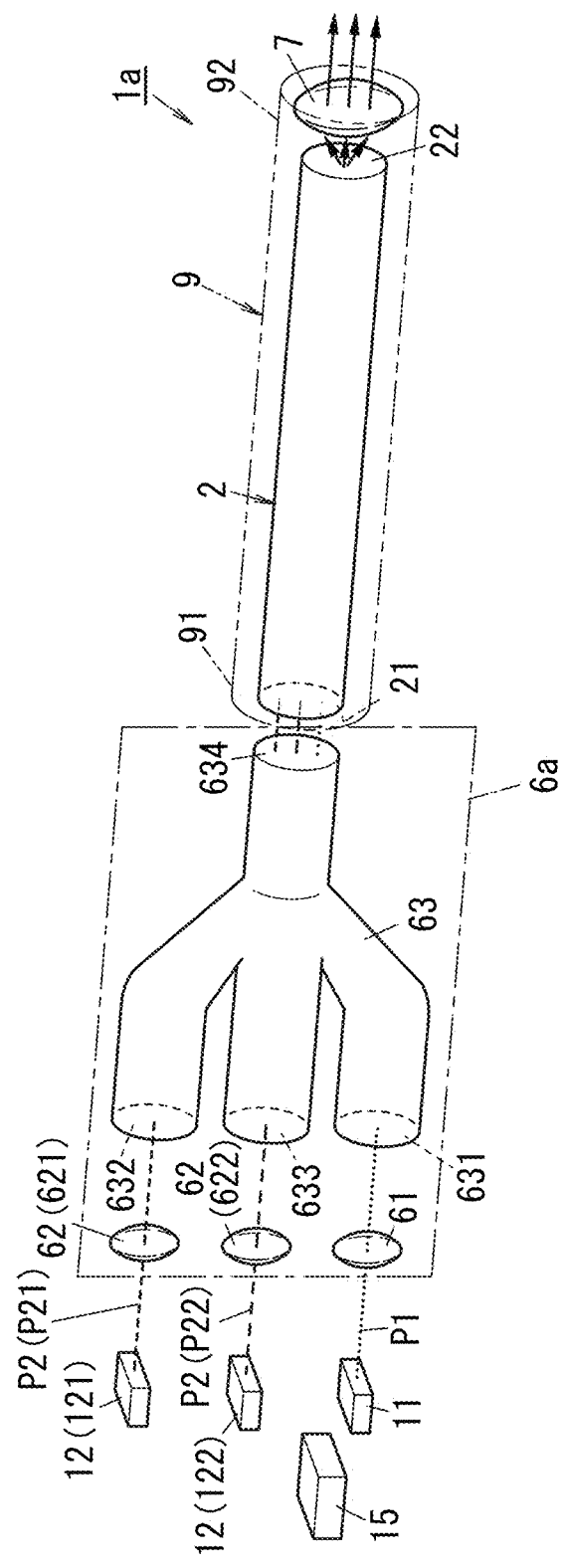
FIG. 4 illustrates a configuration for a lighting system according to a second embodiment.

Next, a lighting system 1a according to a second embodiment will be described with reference to FIG. 4. In the following description, any constituent element of the lighting system 1a according to this second embodiment, having the same function as a counterpart of the lighting system 1 according to the first embodiment described above, will be designated by the same reference numeral as that counterpart's, and description thereof will be omitted herein.

The lighting system 1a according to the second embodiment includes an optical system 6a instead of the optical system 6 of the lighting system 1 according to the first embodiment, which is a difference from the lighting system 1 according to the first embodiment.

The optical system 6a includes not only the first condenser lens 61 and the two second condenser lenses 62 but also an optical multiplexer 63 as well. The optical multiplexer 63 is interposed between the first condenser lens 61 and the two second condenser lenses 621, 622 and the light inlet portion 21 of the wavelength-converting fiber 2. The optical multiplexer 63 combines together the excitation light P1 condensed by the first condenser lens 61, the seed light ray P21 condensed by the second condenser lens 621, and the seed light ray P22 condensed by the second condenser lens 622 to make the combined light incident on the light inlet portion 21 of the wavelength-converting fiber 2.

The optical multiplexer 63 is a combiner (multi-wavelength combiner). The optical multiplexer 63 includes a first inlet portion 631 facing the first condenser lens 61, a second inlet portion 632 facing the second condenser lens 621, a second inlet portion 633 facing the second condenser lens 622, and an output portion 634 facing the light inlet portion 21 of the wavelength-converting fiber 2. The optical multiplexer 63 does not have to be a combiner but may also be, for example, a fiber-optic coupler or a waveguide coupler.

The lighting system 1a according to the second embodiment allows the excitation light P1 and the respective seed light rays P21, P22 to be incident on the light inlet portion 21 of the wavelength-converting fiber 2 more efficiently than the lighting system 1 according to the first embodiment, thus contributing to increasing the light output.

Third Embodiment

Figure 5A:
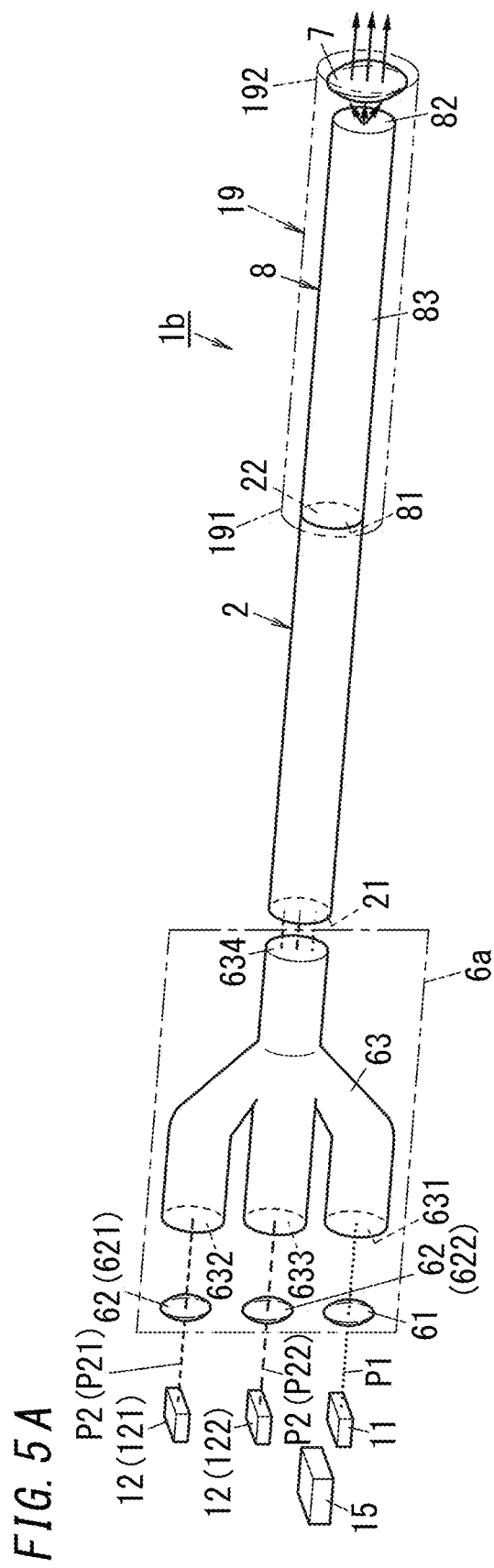
FIG. 5A illustrates a configuration for a lighting system according to a third embodiment.
Figure 5B:
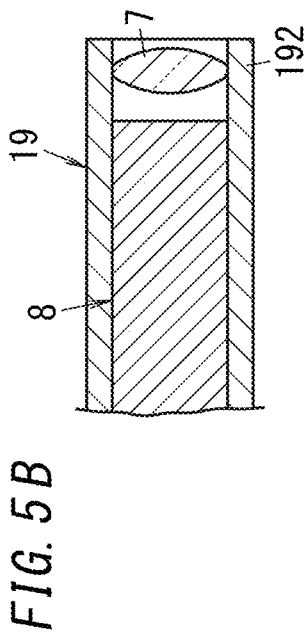
FIG. 5B is a cross-sectional view of a part of the lighting system.

Next, a lighting system 1b according to a third embodiment will be described with reference to FIGS. 5A and 5B. In the following description, any constituent element of the lighting system 1b according to this third embodiment, having the same function as a counterpart of the lighting system 1a according to the second embodiment described above, will be designated by the same reference numeral as that counterpart's, and description thereof will be omitted herein.

The lighting system 1b according to the third embodiment includes an optical fiber 8, which is a difference from the lighting system 1a according to the second embodiment described above. In addition, the lighting system 1b according to the third embodiment does not include the protective tube 9 of the lighting system 1a according to the second embodiment but includes a protective tube 19 for protecting the optical fiber 8, which is another difference from the lighting system 1a according to the second embodiment.

The optical fiber 8 is interposed between the light outlet portion 22 of the wavelength-converting fiber 2 and the output lens 7. The optical fiber 8 propagates the light coming from the light outlet portion 22 of the wavelength-converting fiber 2 to direct the light toward the output lens 7. The optical fiber 8 does not include the wavelength-converting portion 23 of the wavelength-converting fiber 2. In other words, the optical fiber 8 contains no wavelength-converting element and does not have the wavelength-converting function. The optical fiber 8 is directly connected to the wavelength-converting fiber 2 to let the light coming from the wavelength-converting fiber 2 be incident thereon. The optical fiber 8 is coupled to the wavelength-converting fiber 2. The optical fiber 8 includes a light inlet portion 81 and a light outlet portion 82. In the optical fiber 8, the light inlet portion 81 of the optical fiber 8 is bonded, by melting, to the light outlet portion 22 of the wavelength-converting fiber 2. In the optical fiber 8, the light outlet portion 82 of the optical fiber 8 faces the output lens 7. The diameter of the core of the optical fiber 8 is preferably equal to or greater than the diameter of the core 3 (refer to FIG. 2) of the wavelength-converting fiber 2. For example, the diameter of the core of the optical fiber 8 may be approximately equal to the diameter of the wavelength-converting fiber 2. In the lighting system 1b, the difference in refractive index between the core of the optical fiber 8 and the core 3 of the wavelength-converting fiber 2 is preferably small.

In the lighting system 1b according to the third embodiment, the output lens 7 is held by the protective tube 19. The output lens 7 is disposed inside the protective tube 19 and faces the light outlet portion 82 of the optical fiber 8.

The protective tube 19 protects the optical fiber 8. A material for the protective tube 19 may be a metal, for example. The protective tube 19 has flexibility. The protective tube 19 has a first end 191 and a second end 192. The protective tube 19 surrounds the side surface 83 of the optical fiber 8. In the protective tube 19, the first end 191 of the protective tube 19 surrounds the light inlet portion 81 of the optical fiber 8 and the second end 192 of the protective tube 19 surrounds the light outlet portion 82 of the optical fiber 8 and the output lens 7.

The lighting system 1b according to the third embodiment, as well as the lighting system 1a according to the second embodiment, includes the wavelength-converting portion 23 (refer to FIG. 2) containing the wavelength-converting element, the first light source unit 11, the two second light source units 12, and the output lens 7. This allows the lighting system 1b according to the third embodiment to increase the intensity of light (stimulated emission of light P3) having a different wavelength from the excitation light P1.

In addition, the lighting system 1b according to the third embodiment includes the optical fiber 8 interposed between the light outlet portion 22 of the wavelength-converting fiber 2 and the output lens 7. This contributes to cutting down the cost when the distance from the light inlet portion 21 of the wavelength-converting fiber 2 to the output lens 7 needs to be increased.

Furthermore, the lighting system 1b according to the third embodiment includes the optical fiber 8 interposed between the light outlet portion 22 of the wavelength-converting fiber 2 and the output lens 7. Thus, when the lighting system 1b is used as a lighting system for endoscopes, for example, a fiber scope, including the optical fiber 8, the output lens 7, and the protective tube 19, may be inserted into a human body with the wavelength-converting fiber 2 positioned outside of the human body. This allows the lighting system 1b to reduce an increase in the temperature of the fiber scope inserted into the human body.

Fourth Embodiment

Next, a lighting system 1c according to a fourth embodiment will be described with reference to FIGS. 6A and 6B. In the following description, any constituent element of the lighting system 1c according to this fourth embodiment, having the same function as a counterpart of the lighting system 1b according to the third embodiment described above, will be designated by the same reference numeral as that counterpart's, and description thereof will be omitted herein.

As shown in FIG. 6B, the lighting system 1c according to the fourth embodiment includes a wavelength-converting fiber 2c instead of the wavelength-converting fiber 2 of the lighting system 1b according to the third embodiment, and the wavelength-converting fiber 2c includes a plurality of (e.g., two) wavelength-converting portions 23, which is a difference from the lighting system 1b according to the third embodiment. The wavelength-converting fiber 2c, as well as the wavelength-converting fiber 2, includes the core 3, the cladding 4, and the jacket 5.

In this wavelength-converting fiber 2c, the plurality of (e.g., two) wavelength-converting portions 23 contain mutually different wavelength-converting elements. The plurality of wavelength-converting portions 23 are arranged side by side along the optical axis of the core 3. In the following description, one of the two wavelength-converting portions 23 which is located closer to the light inlet portion 21 of the wavelength-converting fiber 2c than to the light outlet portion 22 thereof will be hereinafter sometimes referred to as a "first wavelength-converting portion 231" and the other wavelength-converting portion 23 which is located closer to the light outlet portion 22 of the wavelength-converting fiber 2c than to the light inlet portion 21 thereof will be hereinafter sometimes referred to as a "second wavelength-converting portion 232" for the sake of convenience.

The first wavelength-converting portion 231 may contain, for example, Pr as the wavelength-converting element and the second wavelength-converting portion 232 may contain, for example, Tb as the wavelength-converting element. Note that the combination of the wavelength-converting elements contained in the first wavelength-converting portion 231 and the second wavelength-converting portion 232 does not have to be Pr and Tb as long as the combination of the wavelength-converting elements are two elements selected from the group consisting of Pr, Tb, Ho, Dy, Er, Eu, Nd, and Mn. In this embodiment, the first wavelength-converting portion 231 and the second wavelength-converting portion 232 have the same length. However, this is only an example and should not be construed as limiting. Alternatively, the first wavelength-converting portion 231 and the second wavelength-converting portion 232 may have mutually different lengths.

The lighting system 1c according to the fourth embodiment includes the wavelength-converting portions 23 containing the wavelength-converting elements, the first light source unit 11, the two second light source units 12, the optical system 6, and the output lens 7. Thus, the lighting system 1c according to the fourth embodiment, as well as the lighting system 1b according to the third embodiment, may also increase the intensity of light (stimulated emission of light P3) having a different wavelength from the excitation light P1.

In addition, in the lighting system 1c according to the fourth embodiment, the plurality of (e.g., two) wavelength-converting portions 23 contain mutually different wavelength-converting elements, thus contributing to improving the color rendering performance.

Other Variations

Note that the first to fourth embodiments described above are only exemplary ones of various embodiments of the present disclosure and should not be construed as limiting. Rather, the first to fourth exemplary embodiments may be readily modified in various manners depending on a design choice or any other factor without departing from the scope of the present disclosure.

For example, the lighting system 1, 1a, 1b, 1c does not have to be used as an endoscope in medical applications but may also be used for lighting in endoscopes in industrial applications, for display purposes, and for illuminations. The lighting system 1, 1a, 1b, 1c may be applied to a facility or a mover, whichever is appropriate. Examples of facilities to which the lighting system 1, 1a, 1b, 1c is applicable include warehouses, airports, single-family dwelling houses, multi-family dwelling houses, office buildings, stores, art museums, hotels, and factories. Examples of movers to which the lighting system 1, 1a, 1b, 1c is applicable include automobiles, bicycles, railway trains, aircrafts, watercrafts, and drones.

The laser light source included in the first light source unit 11 does not have to be a semiconductor laser diode that emits a blue laser beam but may also be, for example, a semiconductor laser diode that emits a violet laser beam. Furthermore, the first light source unit 11 does not have to include the semiconductor laser diode but may have a configuration including, for example, a light-emitting diode (LED) light source and an optical system.

The second light source unit 121 does not have to be a semiconductor laser diode that emits a green laser beam but may also be an LED that emits a green light beam. The second light source unit 122 does not have to be a semiconductor laser diode that emits a red laser beam but may also be, for example, an LED that emits a red light beam.

Furthermore, the relative arrangement of the first light source unit 11 and the plurality of second light source units 12 with respect to the light inlet portion 21 of the wavelength-converting fiber 2 does not have to be one of the relative arrangements described for the first to third embodiments. For example, in the lighting system 1, the relative arrangement of the first light source unit 11 and the plurality of second light source units 12 with respect to the light inlet portion 21 of the wavelength-converting fiber 2 may be changed by disposing, as a light source system, a cross dichroic prism between the first light source unit 11 and the plurality of second light source units 12 and the light inlet portion 21 of the wavelength-converting fiber 2. Likewise, the relative arrangement of the first light source unit 11 and the plurality of second light source units 12 with respect to the light inlet portion 21 of the wavelength-converting fiber 2c does not have to be the relative arrangement described for the fourth embodiment. The optical system 6 does not have to include the first condenser lens 61, the second condenser lens 621, and the second condenser lens 622, which are provided separately from each other. Alternatively, the optical system 6 may also be a single condenser lens for condensing the excitation light P1 and the plurality of seed light rays P2.

Furthermore, in the lighting system 1, 1a, 1b, a plurality of second light source units 12 are provided for a single wavelength-converting fiber 2. However, this is only an example and should not be construed as limiting. Rather, at least one second light source unit 12 has only to be provided for a single wavelength-converting fiber 2. Furthermore, in the lighting system 1c, a plurality of second light source units 12 are provided for a single wavelength-converting fiber 2c. However, this is only an example and should not be construed as limiting. Rather, at least one second light source unit 12 has only to be provided for a single wavelength-converting fiber 2c.

Aspects

The first to fourth embodiments and their variations described above are specific implementations of the following aspects of the present disclosure.

A lighting system (1; 1a; 1b; 1c) according to a first aspect includes a wavelength-converting fiber (2; 2c), a first light source unit (11), a second light source unit (12), an optical system (6; 6a), and an output lens (7). The wavelength-converting fiber (2; 2c) includes: a light inlet portion (21); a light outlet portion (22); and a wavelength-converting portion (23) containing a wavelength-converting element. The wavelength-converting portion (23) is interposed between the light inlet portion (21) and the light outlet portion (22). The wavelength-converting element may be excited not only by excitation light (P1) to produce a spontaneous emission of light having a longer wavelength than the excitation light (P1) but also by an amplified spontaneous emission of light. The first light source unit (11) emits the excitation light (P1). The second light source unit (12) emits a seed light ray (P2) causing the wavelength-converting element that has been excited by either the excitation light (P1) or the amplified spontaneous emission of light to produce a stimulated emission of light (P3). The optical system (6; 6a) makes the excitation light (P1) coming from the first light source unit (11) and the seed light ray (P2) coming from the second light source unit (12) incident on the light inlet portion (21). The output lens (7) condenses outgoing light coming from the light outlet portion (22).

The lighting system (1; 1a; 1b; 1c) according to the first aspect may increase the intensity of light (stimulated emission of light P3) having a different wavelength from the excitation light (P1).

In a lighting system (1; 1a; 1b; 1c) according to a second aspect, which may be implemented in conjunction with the first aspect, the optical system (6; 6a) includes a first condenser lens (61) and a second condenser lens (62). The first condenser lens (61) condenses the excitation light (P1) coming from the first light source unit (11). The second condenser lens (62) condenses the seed light ray (P2) coming from the second light source unit (12).

The lighting system (1; 1a; 1b; 1c) according to the second aspect allows the excitation light (P1) and the seed light ray (P2) to be more efficiently incident on the light inlet portion (21) of the wavelength-converting fiber (2; 2c), thus contributing to increasing the light output.

In a lighting system (1a; 1b; 1c) according to a third aspect, which may be implemented in conjunction with the second aspect, the optical system (6a) further includes an optical multiplexer (63). The optical multiplexer (63) is interposed between the first condenser lens (61) and the second condenser lens (62) and the light inlet portion (21) of the wavelength-converting fiber (2; 2c). The optical multiplexer (63) combines together the excitation light (P1) condensed by the first condenser lens (61) and the seed light ray (P2) condensed by the second condenser lens (62) to make light thus combined incident on the light inlet portion (21).

The lighting system (1a; 1b; 1c) according to the third aspect allows the excitation light (P1) and the seed light ray (P2) to be more efficiently incident on the light inlet portion (21) of the wavelength-converting fiber (2; 2c), thus contributing to increasing the light output.

A lighting system (1b; 1c) according to a fourth aspect, which may be implemented in conjunction with any one of the first to third aspects, further includes an optical fiber (8). The optical fiber (8) is interposed between the light outlet portion (22) of the wavelength-converting fiber (2; 2c) and the output lens (7). The optical fiber (8) propagates light coming from the light outlet portion (22) of the wavelength-converting fiber (2; 2c) therethrough to direct the light toward the output lens (7).

The lighting system (1b; 1c) according to the fourth aspect may contribute to cutting down the cost in a situation where the distance from the light inlet portion (21) of the wavelength-converting fiber (2; 2c) to the output lens (7) thereof needs to be increased.

A lighting system (1b; 1c) according to a fifth aspect, which may be implemented in conjunction with the fourth aspect, further includes a protective tube (19) having flexibility. The protective tube (19) surrounds a side surface (83) of the optical fiber (8). The output lens (7) is held by the protective tube (19).

The lighting system (1b; 1c) according to the fifth aspect allows the optical fiber (8) and the output lens (7) to be protected by the protective tube (19).

In a lighting system (1c) according to a sixth aspect, which may be implemented in conjunction with any one of the first to fifth aspects, the wavelength-converting fiber (2c) includes a plurality of the wavelength-converting portions (23). The plurality of the wavelength-converting portions (23) respectively contain a plurality of the wavelength-converting elements that are different from each other.

The lighting system (1c) according to the sixth aspect may improve the color rendering performance.

In a lighting system (1; 1a; 1b; 1c) according to a seventh aspect, which may be implemented in conjunction with any one of the first to sixth aspects, the first light source unit (11) includes a laser light source.

The lighting system (1; 1a; 1b; 1c) according to the seventh aspect may increase the intensity of the excitation light (P1).

A lighting system (1; 1a; 1b; 1c) according to an eighth aspect, which may be implemented in conjunction with any one of the first to seventh aspects, includes a plurality of the second light source units (12). The plurality of the second light source units (12) output a plurality of the seed light rays (P2). The plurality of the seed light rays (P2) output from the plurality of the second light source units (12) have mutually different wavelengths.

The lighting system (1; 1a; 1b; 1c) according to the eighth aspect allows the wavelength-converting fiber (2; 2c) to output light including a plurality of stimulated emissions of light (P3) corresponding one to one to the plurality of seed light rays (P2), thus improving the color rendering performance.

In a lighting system (1; 1a; 1b; 1c) according to a ninth aspect, which may be implemented in conjunction with any one of the first to eighth aspects, the second light source unit (12) includes a laser light source.

The lighting system (1; 1a; 1b; 1c) according to the ninth aspect may increase the intensity of the seed light ray (P2).

In a lighting system (1; 1a; 1b; 1c) according to a tenth aspect, which may be implemented in conjunction with any one of the first to ninth aspects, the wavelength-converting element includes one or more elements selected from the group consisting of Pr, Tb, Ho, Dy, Er, Eu, Nd, and Mn.

The lighting system (1; 1a; 1b; 1c) according to the tenth aspect enables, when the wavelength-converting element includes two or more elements, for example, excitation caused by the amplified spontaneous emission of light from at least one element to produce an amplified spontaneous emission of light from another element at a different wavelength.

In a lighting system (1; 1a; 1b; 1c) according to an eleventh aspect, which may be implemented in conjunction with any one of the first to tenth aspects, the outgoing light emerging from the light outlet portion (22) of the wavelength-converting fiber (2; 2c) falls within a wavelength range from 350 nm through 750 nm.

REFERENCE SIGNS LIST 1, 1a, 1b, 1c Lighting System
2, 2c Wavelength-Converting Fiber
21 Light Inlet Portion
22 Light Outlet Portion
23 Wavelength-Converting Portion
6, 6a Optical System
61 First Condenser Lens
62 Second Condenser Lens
621 Second Condenser Lens
622 Second Condenser Lens
63 Optical Multiplexer
7 Output Lens
8 Optical Fiber
83 Side Surface
9 Protective Tube
11 First Light Source Unit
12 Second Light Source Unit
121 Second Light Source Unit
122 Second Light Source Unit
15 Adjustment Unit
19 Protective Tube
P1 Excitation Light
P2 Seed Light Ray
P21 Seed Light Ray
P22 Seed Light Ray
P3 Stimulated Emission of Light
P31 Stimulated Emission of Light
P32 Stimulated Emission of Light

The invention claimed is:

1. A lighting system comprising:
a wavelength-converting fiber including: a light inlet portion; a light outlet portion; and a wavelength-converting portion interposed between the light inlet portion and the light outlet portion, the wavelength-converting portion containing a wavelength-converting element, the wavelength-converting element being able to be excited not only by excitation light to produce a spontaneous emission of light having a longer wavelength than the excitation light but also by an amplified spontaneous emission of light;
a first light source unit configured to emit the excitation light;
a second light source unit configured to emit a seed light ray causing the wavelength-converting element that has been excited by either the excitation light or the amplified spontaneous emission of light to produce a stimulated emission of light;
an optical system configured to make the excitation light coming from the first light source unit and the seed light ray coming from the second light source unit incident on the light inlet portion;
an output lens configured to condense outgoing light coming from the light outlet portion; and
a protective tube having flexibility and surrounding a side surface of the wavelength-converting fiber;
the output lens being disposed inside the protective tube.

2. The lighting system of claim 1, wherein
the optical system includes:
a first condenser lens configured to condense the excitation light coming from the first light source unit; and
a second condenser lens configured to condense the seed light ray coming from the second light source unit.

3. The lighting system of claim 2, wherein
the optical system further includes an optical multiplexer interposed between the first condenser lens and the second condenser lens and the light inlet portion of the wavelength-converting fiber, the optical multiplexer being configured to combine together the excitation light condensed by the first condenser lens and the seed light ray condensed by the second condenser lens to make light thus combined incident on the light inlet portion.

4. The lighting system of claim 1, wherein
the wavelength-converting fiber includes a plurality of the wavelength-converting portions, and
the plurality of the wavelength-converting portions respectively contain a plurality of the wavelength-converting elements that are different from each other.

5. The lighting system of claim 1, wherein
the first light source unit includes a laser light source.

6. The lighting system of claim 1, wherein
the lighting system includes a plurality of the second light source units,
the plurality of the second light source units are configured to output a plurality of the seed light rays, and
the plurality of the seed light rays output from the plurality of the second light source units have mutually different wavelengths.

7. The lighting system of claim 1, wherein
the second light source unit includes a laser light source.

8. The lighting system of claim 1, wherein
the wavelength-converting element includes one or more elements selected from the group consisting of Pr, Tb, Ho, Dy, Er, Eu, Nd, and Mn.

9. The lighting system of claim 1, wherein
the outgoing light emerging from the light outlet portion falls within a wavelength range from 350 nm through 750 nm.

10. A lighting system comprising:
a wavelength-converting fiber including: a light inlet portion; a light outlet portion; and a wavelength-converting portion interposed between the light inlet portion and the light outlet portion, the wavelength-converting portion containing a wavelength-converting element, the wavelength-converting element being able to be excited not only by excitation light to produce a spontaneous emission of light having a longer wavelength than the excitation light but also by an amplified spontaneous emission of light;
a first light source unit configured to emit the excitation light;
a second light source unit configured to emit a seed light ray causing the wavelength-converting element that has been excited by either the excitation light or the amplified spontaneous emission of light to produce a stimulated emission of light;
an optical system configured to make the excitation light coming from the first light source unit and the seed light ray coming from the second light source unit incident on the light inlet portion;
an output lens configured to condense outgoing light coming from the light outlet portion;
an optical fiber interposed between the light outlet portion of the wavelength-converting fiber and the output lens, the optical fiber being configured to propagate light coming from the light outlet portion to direct the light toward the output lens; and a protective tube having flexibility and surrounding a side surface of the optical fiber;

the output lens being disposed inside the protective tube.

11. The lighting system of claim 10, wherein the output lens is held by the protective tube.

* * * * *